United States Patent [19]

Spencer

[11] 4,041,813

[45] Aug. 16, 1977

[54] METHOD AND APPARATUS FOR TRANSVERSE CUTTING

[75] Inventor: Harvey J. Spencer, Green Bay, Wis.

[73] Assignee: Paper Converting Machine Company, Green Bay, Wis.

[21] Appl. No.: 658,181

[22] Filed: Feb. 17, 1976

[51] Int. Cl.[2] .......................... B26D 1/56; B23D 25/02

[52] U.S. Cl. .......................................... 83/14; 83/37; 83/329; 83/327; 83/174

[58] Field of Search ........................ 83/14, 37, 38, 174, 83/329, 337, 327

[56] References Cited

U.S. PATENT DOCUMENTS

| | | | |
|---|---|---|---|
| 1,846,942 | 2/1932 | Bronander et al. | 83/329 |
| 3,213,731 | 10/1965 | Renard | 83/329 |

FOREIGN PATENT DOCUMENTS

| | | | |
|---|---|---|---|
| 253,666 | 4/1967 | Austria | 83/329 |

*Primary Examiner*—Donald R. Schran
*Attorney, Agent, or Firm*—Tilton, Fallon, Lungmus, Chestnut & Hill

[57] ABSTRACT

A method and apparatus for the transverse cutting of elongated material such as superposed web plies (for example, a convolutely wound log) wherein the material is uniformly advanced along an axial path and a cutting disc blade is moved through an orbit in planetary fashion which intersects the path and is skewed relative thereto while the disc blade is rotating in planes perpendicular to the path.

5 Claims, 33 Drawing Figures

FIG. 19
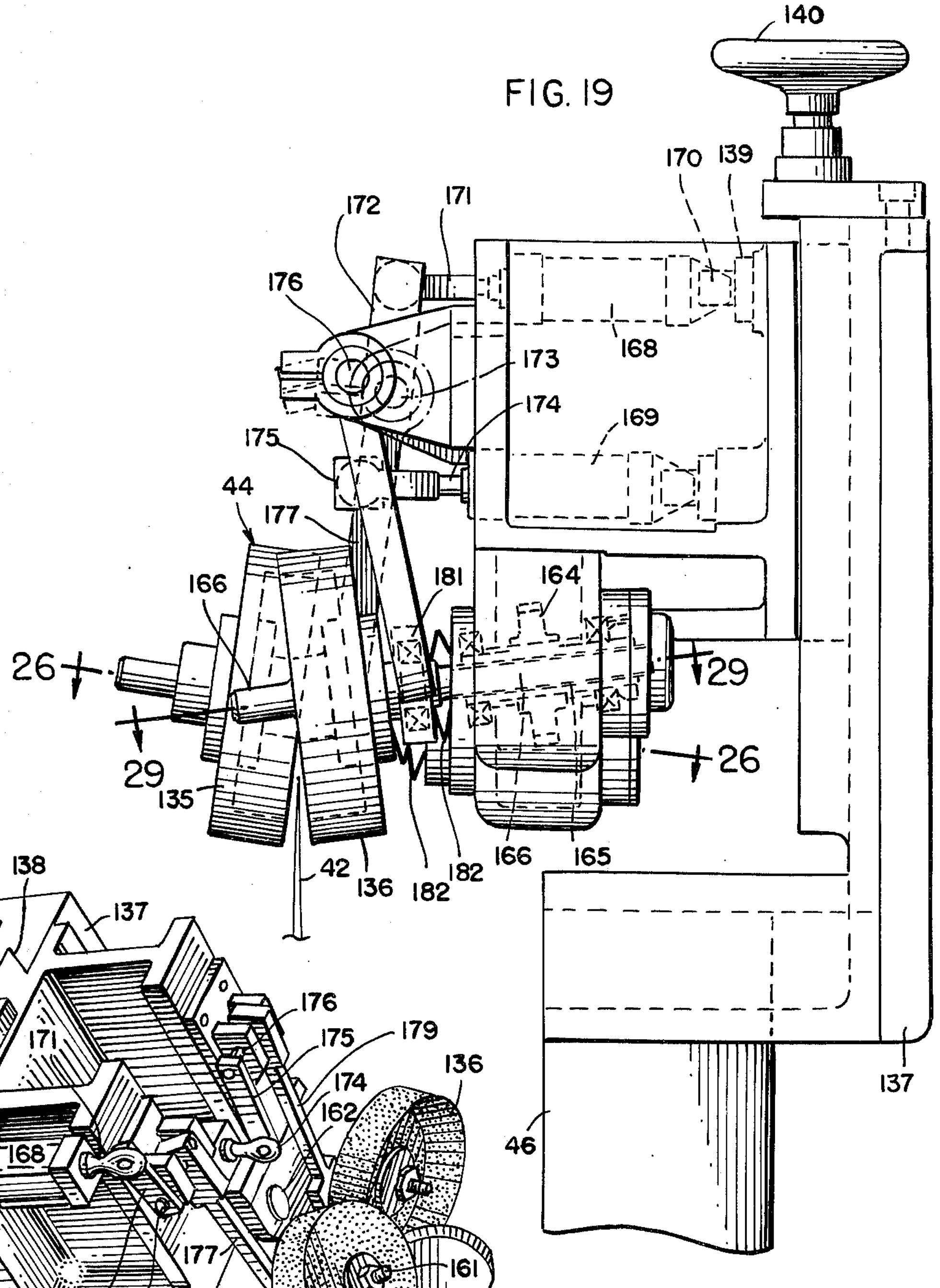
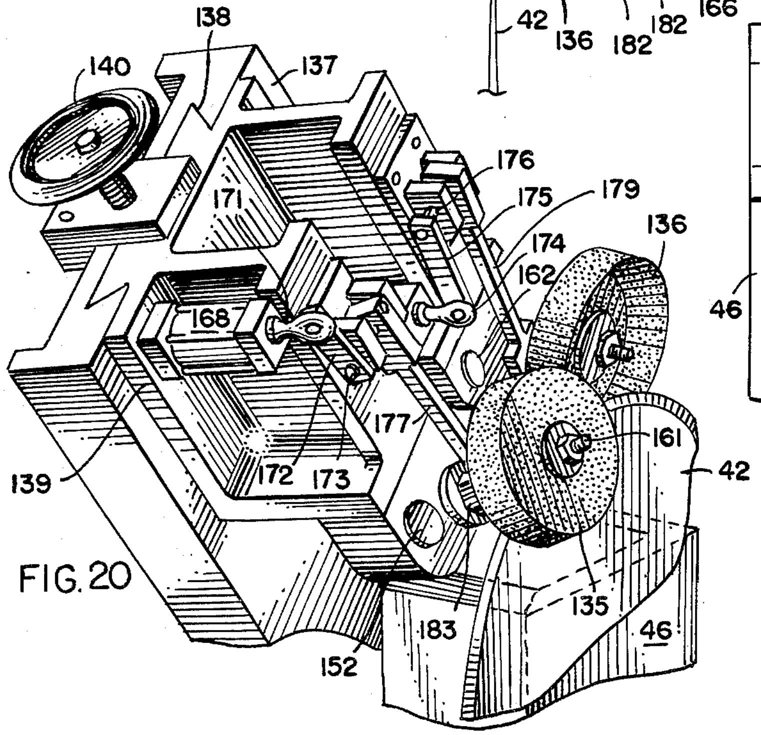
FIG. 20

FIG. 22
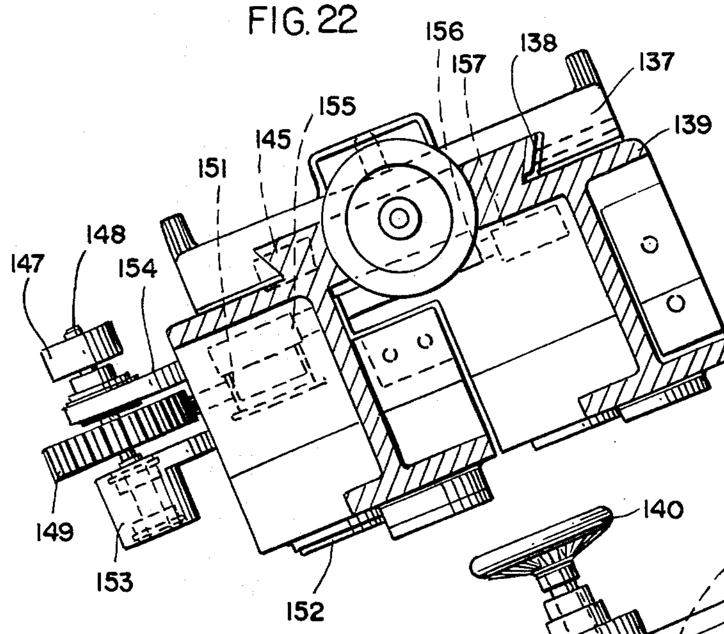
FIG. 23
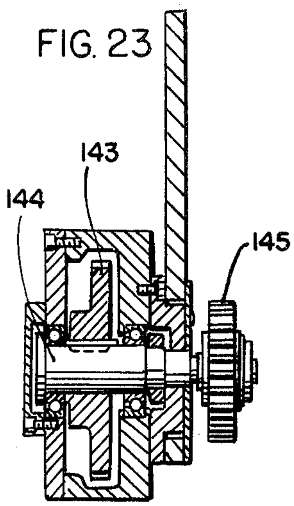
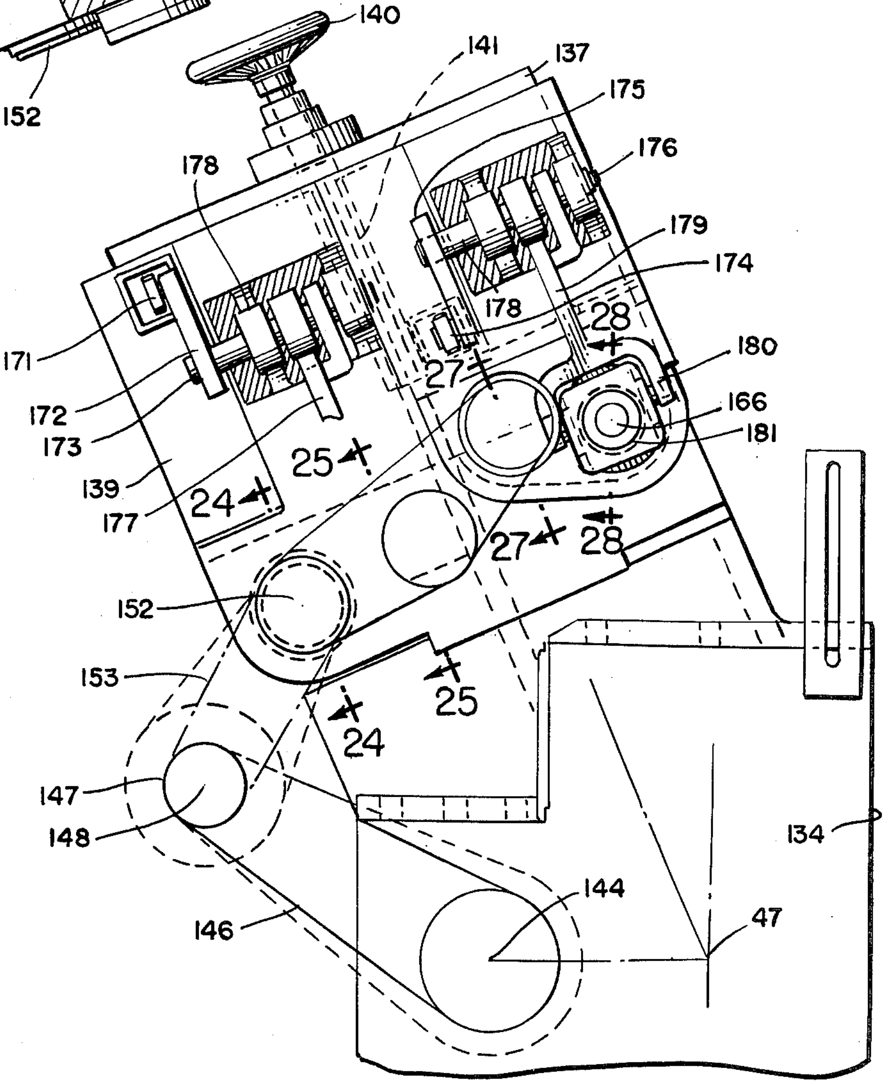
FIG. 21

METHOD AND APPARATUS FOR TRANSVERSE CUTTING

BACKGROUND OF THE INVENTION

This invention relates to a method and apparatus for transversely cutting elongated material such as superposed web plies and, more particularly, to the use of a unique orbiting saw for cutting through elongated web material such as toilet tissue and toweling logs or stacked superposed plies such as folded tissues and towels.

In the production of web rolls such as toilet paper and toweling, a jumbo sized roll (often 4 to 6 feet in diameter and upwards of 6 feet in length) was unwound, transversely perforated, longitudinally slit and rewound to provide the well known retail size rolls. This was done continuously and automatically in "rewinders" such as can be seen in U.S. Pat. No. 2,769,600. In the late 1950's and early 1960's, it was realized that problems could arise because of the longitudinal slitting, i.e., slicing the relatively wide web into 4½ inch widths (a square of toilet paper conventionally being 4½ by 4½ inches). If the wide sheet were imperfect in spots (sometimes characterized as "fish-eyes" and referring to large holes in the paper) the entire rewinder had to be shut down because of discontinuity in the winding. Therefore, the longitudinal slitting during the rewinding was eliminated and the rewound, transversely perforated roll or log transferred from the rewinder to a log saw. Because automation was important to maintain high production rates and low economy, the log saws were integrated into the rewinder line.

Among the first log saws were the so-called "Gilbertville" saws employing a circular disc having a peripheral cutting edge which oscillated back and forth across the path of the wound log emanating from the rewinder. The Gilbertville saw can be seen in U.S. Pat. Nos. 2,752,999 and 2,766,566. As the rewinder speeds increased, a new variety of log saw appeared and gained popularity, this being the "orbiting" saw — see Renard U.S. Pat. No. 3,213,721.

As rewinder speeds became greater and greater — thereby requiring more logs to be sawed per unit of time, various improvements were made in the orbiting saws such as the variable-speed orbit saw of U.S. Pat. Nos. 3,213,734 and 3,292,470. In an effort to keep up with the high volume output of rewinders, the art even went to transversely cutting four logs simultaneously, i.e., four lanes of logs being advanced through the sawing station — see U.S. Pat. No. 3,905,260. However, this involved expensive and complicated indexing machinery, i.e., apparatus for stepping the logs or stacks into the sawing station for each cut.

With the increased demand for paper rolls and stacks and the ability to deliver the same at high volume from rewinders, it became clear that the existing orbital saws could not maintain the pace. Of course, additional saws could be placed in parallel but this created material handling problems, occupied valuable space, and was generally inefficient.

SUMMARY OF INVENTION

The above severe time problem has been overcome through the use of a unique orbiting saw wherein the logs or stacks are advanced uniformly and continuously along an axial path. At the same time, the disc blade is moved through an orbit which is skewed relative to the patch of advance but the cutting disc blade is mounted on the skewed member so as to rotate always in planes perpendicular to the path of advance, thereby developing the necessary square cut. More particularly, the support for the disc blade, although orbiting, remains in a fixed attitude with respect to the ground, i.e., it moves in "planetary" fashion about the orbit axis. Here, I employ the term planetary in its engineering sense — and not as a synomym for orbit. Additionally, the cutting disc blade (or blades) can be mounted for slight axial movement (in a direction parallel to the path of advance) so as to compensate for or "match" the component of velocity of the blade in the direction of the path with the velocity of a log or stack moving in the path. Novel and advantageous log moving means are employed to coact with the orbiting blades to assure high speed, reliable operation. Still further, disc blade sharpening devices are mounted on the planetary member so as to maintain high speed, efficient operation as well as avoid the need for stopping th orbiting for sharpening. Other details and facets of the invention, as well as objects and advantages thereof may be seen in the ensuing specification.

DETAILED DESCRIPTION

The invention is described in conjunction with an illustrative embodiment in the accompanying drawing, in which FIG. 1 is a fragmentary perspective view of the cutting portion of the inventive apparatus;

FIG. 19 is a fragmentary side elevational view of a portion of the planetary housing and featuring the sharpening means for the cutting blades;

FIG. 20 is a fragmentary perspective view of the apparatus portion seen in FIG. 19;

FIG. 21 is a front elevational view of the sharpening means of FIG. 19;

FIG. 22 is a top plan view of the sharpening means of FIG. 21;

FIG. 23 is a fragmentary side elevational view of a portion of the drive for the sharpening means of FIGS. 19–22;

Figure 24:
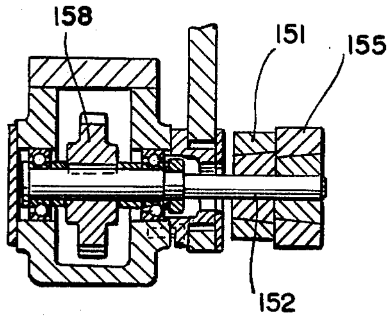
Figure 27:
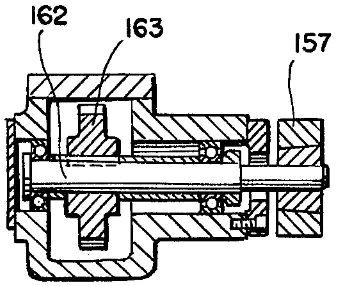
Figure 25:
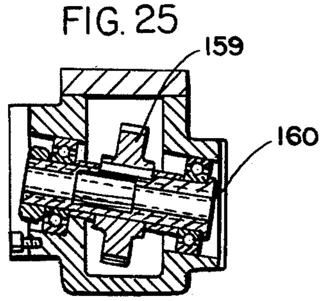
Figure 28:
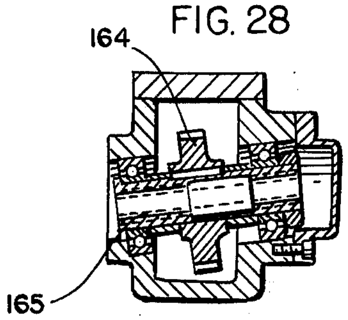
Figure 26:
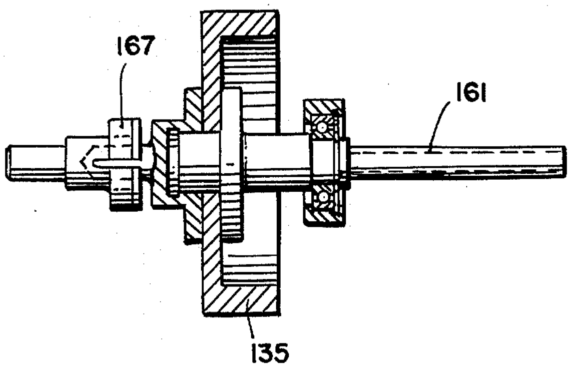
Figure 29:
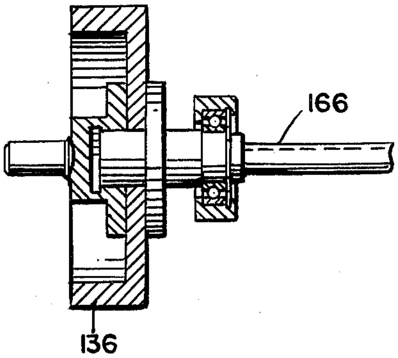
Figure 30:
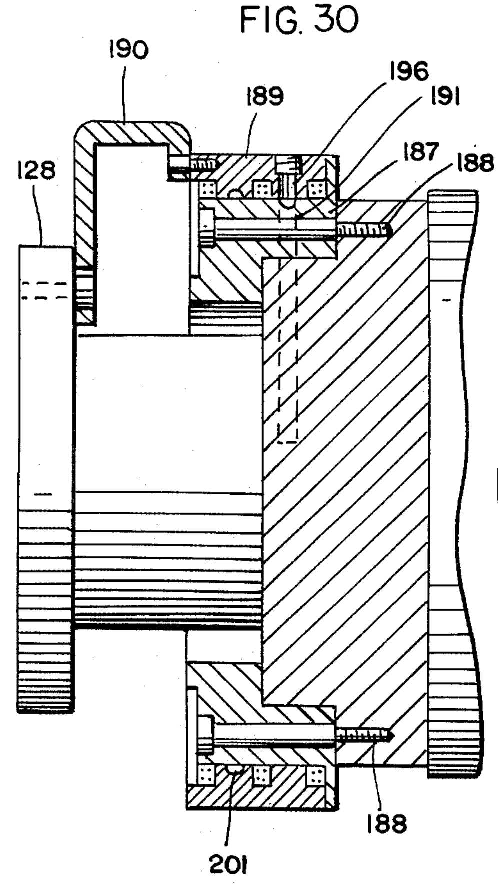
Figure 31:
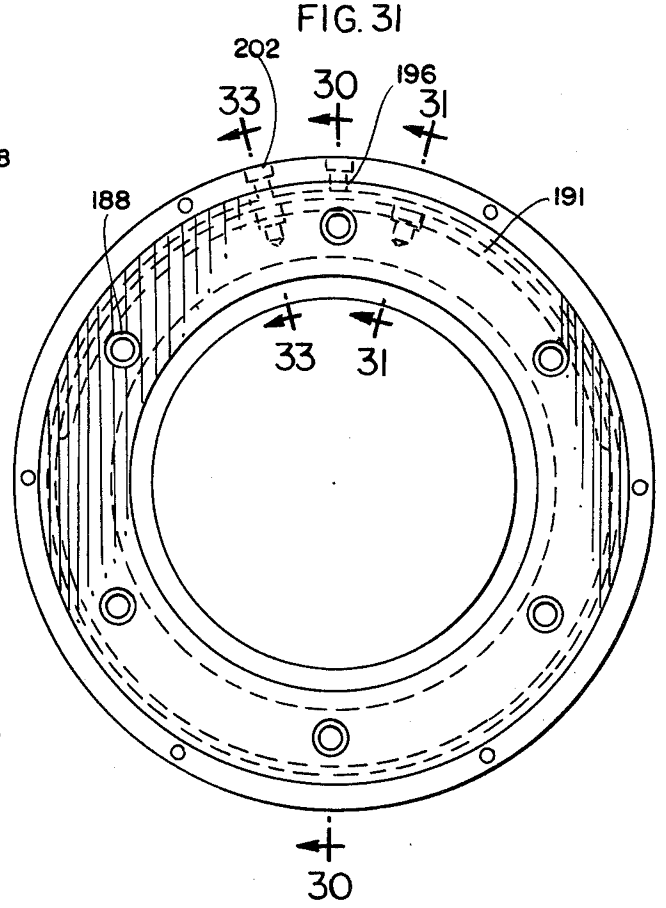
Figure 32:
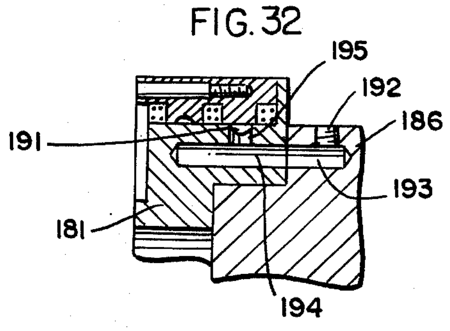
Figure 33:
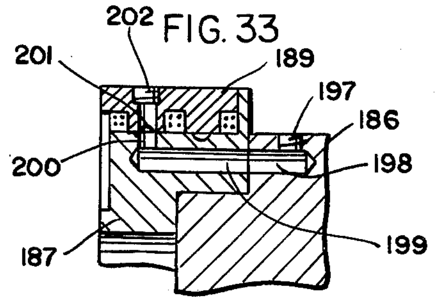

FIGS. 24 and 25 are sectional views taken along the lines 24–24 and 25≧25, respectively of FIG. 21;

FIG. 26 is a sectional view taken along the line 26—26 as applied to FIG. 19;

FIGS. 27 and 28 are sectional views taken along the line 27—27 and 28—28, respectively, of FIG. 21;

FIG. 29 is a sectional view taken along the line 29—29 of FIG. 19;

FIG. 30 is a sectional view taken along the line 30—30 of FIG. 31 and showing a portion of the rotary connection for delivering fluid power to the actuating cylinders for the sharpening means and for delivering coolant to the cutting blades;

FIG. 31 is an end elevational of the fluid rotary connection described in conjunction with FIG. 30; and FIGS. 32 and 33 are sectional views taken along the lines 32—32 and 33—33, respectively of FIG. 31.

OPERATION GENERALLY

Figure 1:
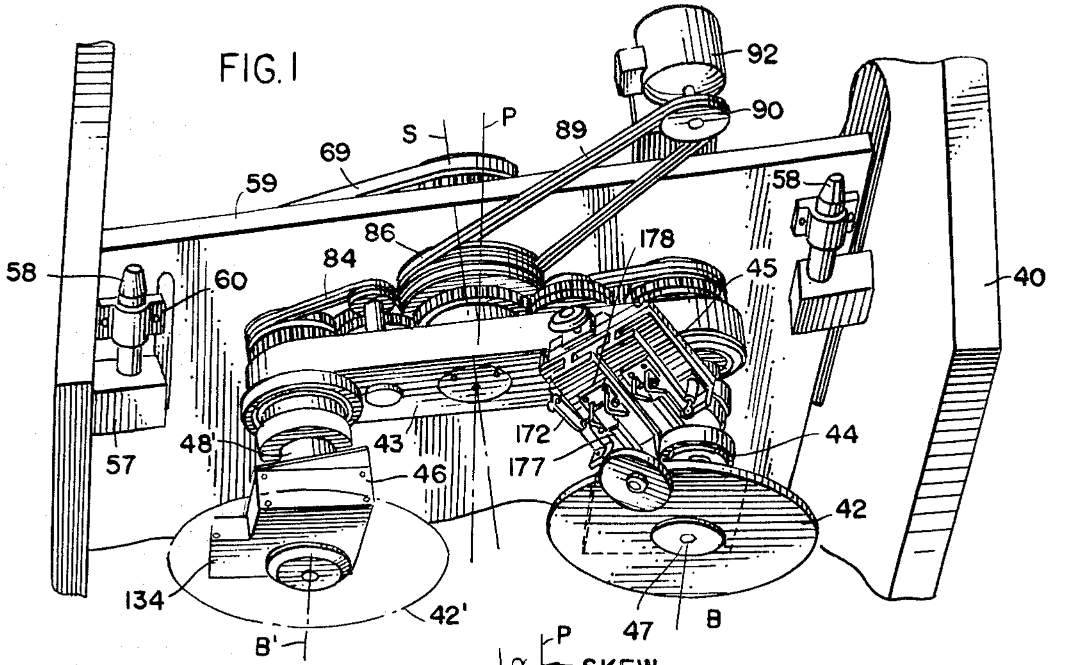

In the illustration given, and with reference to FIG. 1, the numeral 40 designates generally the frame of the inventive saw apparatus. The frame 40 includes a log conveyor 41 (see FIGS. 2 and 18) constituting means for advancing logs L at a constant speed along a path P which can be considered axial relative to the generally cylindrical logs L. Advantageously, two lanes of logs are advanced simultaneously by the conveyor 41. Alternatively stacks of elongated web material can be advanced along the path P such as the C-folded toweling illustrated in U.S. Pat. No. 3,288,009.

The cutting is performed by means of a pair of cutting disc blades 42 and 42′ although it is possible to use only one disc and still realize the benefits of the invention. For example, if the apparatus is set up for toilet paper rolls (having an axial length of 4½ inches) with each blade 42 and 42′ making a cut each cycle or orbit, the machine can be readily altered to toweling (having an axial length of 9 inches) merely by replacing one of the blades 42 or 42′ with a suitable counterweight. Inasmuch as the disc blade mounting and drive mechanism is the same for both blades (the orbit-providing member being essentially symmetrical), only one blade arrangement need be considered.

Figure 2:
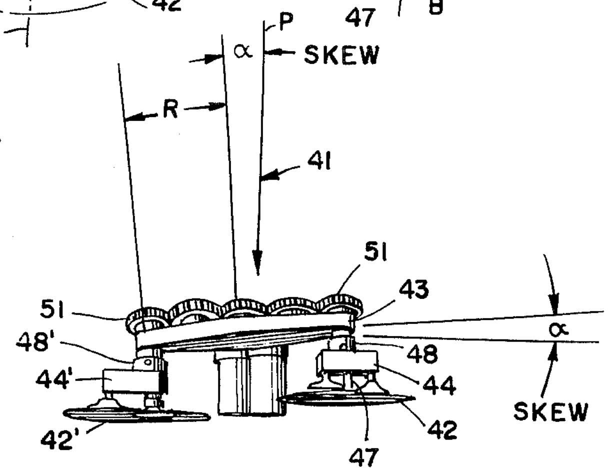
FIG. 2 is a schematic top plan view of the apparatus of FIG. 1 and which is appropriately labeled to show the skew principle.

The novel orbiting is provided by an elongated skew arm 43 (see particularly FIG. 2). The skew angle $\alpha$ is a small acute angle — normally about 5° and can be considered either as the angle the skew arm 43 makes with a plane perpendicular to the path P as designated in FIG. 2, or the angle the axis of rotation S of the skew member 43 makes with the path P: this definition of the skew angle being illustrated and labeled in FIG. 3.

The axes B and B′ of the blades 42 and 42′, however, are parallel to the path P so that the blades are always positioned in planes perpendicular to the path P. The angle of the skew in conjunction with the rotational velocity of the skew arm 43 causes the translation of the blades (in the longitudinal direction parallel to the path P) to match the velocity of the logs at two points during each cycle as will be explained hereinafter with respect to FIG. 13.

Figure 5:
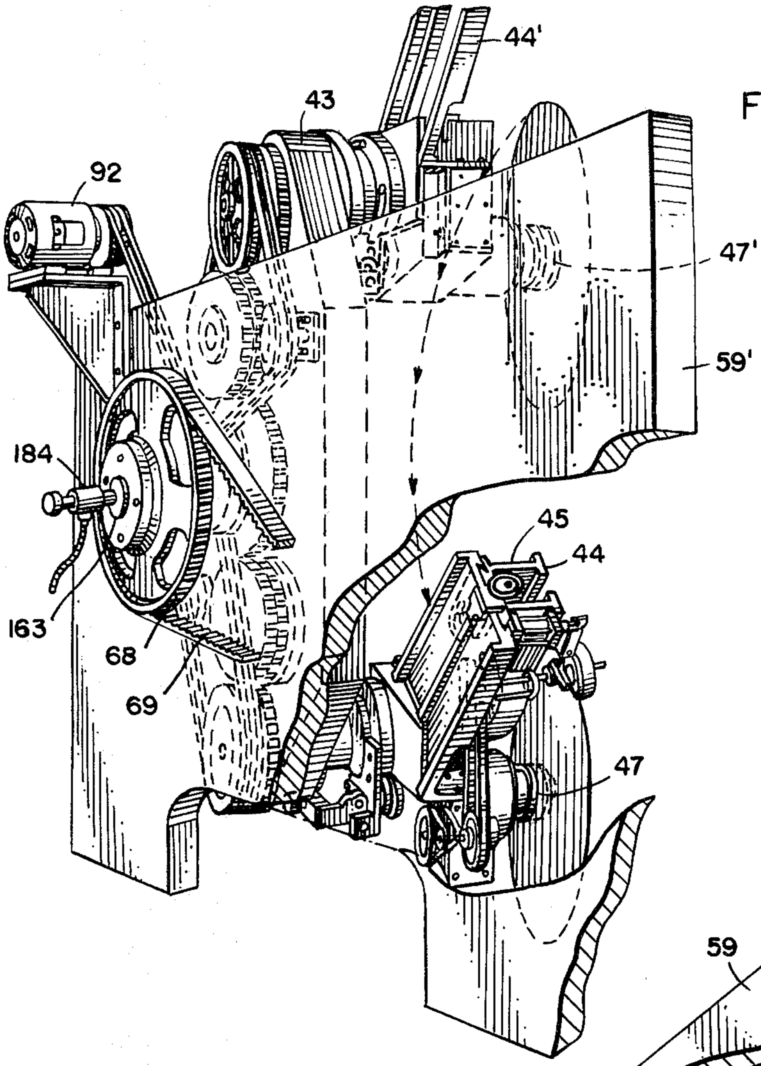
FIG. 5 is another fragmentary perspective view also viewed from the rear but with the skew member vertical as in FIG. 4.

The numerals 44 and 44′ (see FIG. 2) designate sharpening means and, by comparing FIGS. 1 and 5, it will be seen that the sharpening means always maintain the same attitude with respect to the ground, i.e., the frame 40. The sharpening means 44 and 44′ are carried by supports 45 always above the casings 46 for the spindles or shafts 47 and 47′ (see FIG. 5) of the two blades 42 and 42′ — and travel therewith. Thus, it is possible to sharpen each blade 42 and 42′ each cycle — during that portion of the orbit when the blade is not cutting through the log L. This action is made possible by mounting the casings 46 on planetary shafts or supports 48 and 48′ (see FIG. 3).

The planetry shafts 48 and 48′ are also housings for the drives to the cutting blades — in particular, the spindles 47 and 47′. The details of this arrangement will be described in detail hereinafter with respect to FIG. 12.

Figure 3:
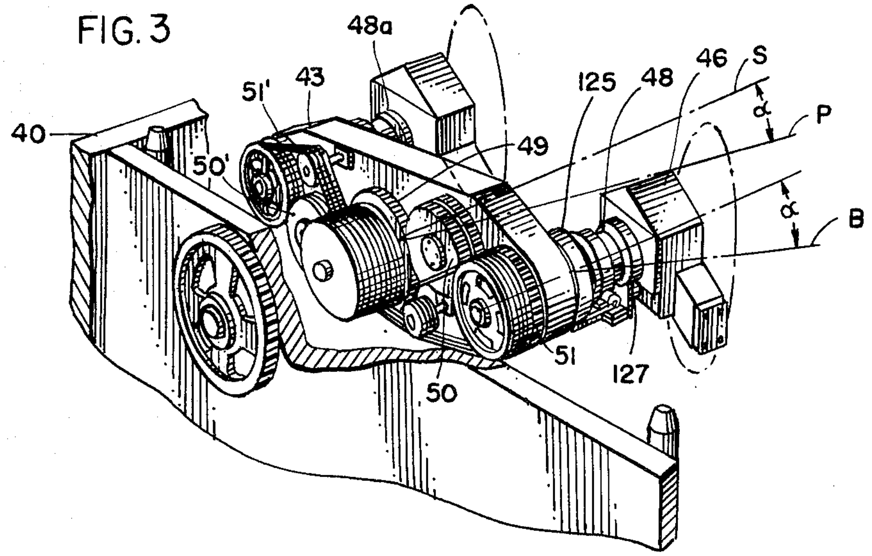
FIG. 3 is another schematic perspective view similar to FIG. 1 but taken from the rear, i.e., from the upstream side of the cutting blades.

The planetry motion i.e., orbiting without rotating of the planetary shaft 48 and 48′ is achieved through a gear train which can be readily appreciated from a consideration of FIG. 3. In FIGS. 3, the numeral 49 designates the stationary main gear of a planetary drive, mounted stationary relative to the frame (see FIG. 10) and is coaxial with the axis of rotation of the skew arm 43. The skew arm 43 carries idler gears 50 and 50′ and planetary gears 51 and 51′ which are associated, respectively, with the planetary shafts 48 and 48′. The orbiting motion imparted to the idler gears 50 and 50′ is canceled by the planetary gears 51 and 51′ so that the planetary shafts 48 and 48′ remain in a fixed attitude relative to the ground. This fixed attitude, in addition to making possible the provision of sharpening means that travel with the cutting blades, also makes possible a relatively simple drive for the blades — even taking into account the reverse "skew" introduced into the system to align the blade spindles 47 and 47′ with the path P.

Figure 6:
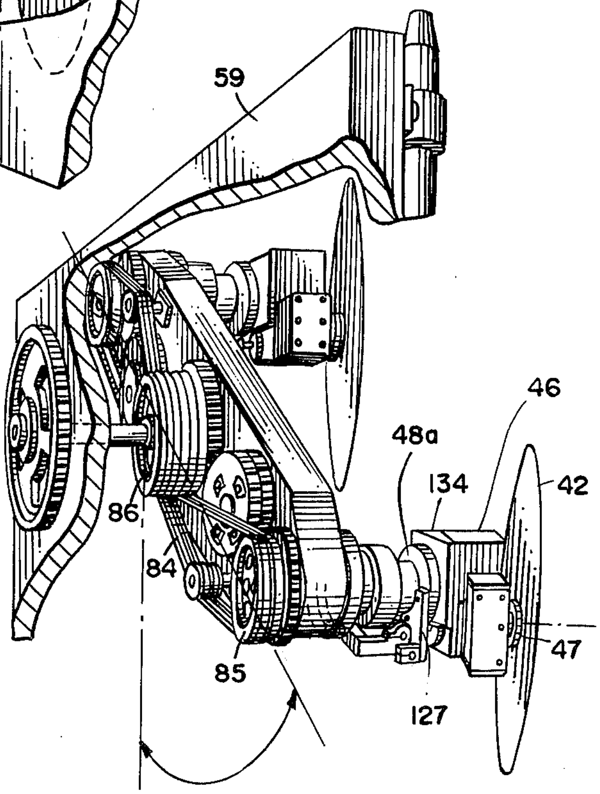
FIG. 6 is still another fragmentary rear perspective view, this view showing the skew arm at about 45°.

In the operation of the apparatus as presented schematically in FIGS. 1–3, for example, the blade 42 is shown in a position shortly before it engages the logs L. As the skew member 43 rotates, the blade 42 moves downwardly and forwardly and, after a half cycle of operation, comes to the position occupied in FIG. 2 by the blade 42′, passing through the orientation depicted in FIG. 6. In FIGS. 1–3, the offset of the blades when they are horizontally aligned can be readily appreciated. When the blades are vertically aligned, as in FIGS. 4–5, the blades 42 and 42′ lie in the same plane. Thus, when a blade is in its cutting mode, it is in the lower half of the orbit and is moving forwardly, i.e., in the direction of log flow. During the upper half of the orbit of each blade, the blade is moving rearwardly. However, at all times, each blade is rotating in a series of planes all perpendicular to the path P.

The skew angle $\alpha$ is a function of the log velocity and the geometry of the system — for a log speed of 45 inches per second, (yielding 1200 toilet paper rolls per minute) and for an offset of the blade spindle 47 and 47′ of 18 inches, the skew angle $\alpha$ is approximately 5°.

DETAILS OF SKEW ARM SUPPORT AND DRIVE

Figure 4:
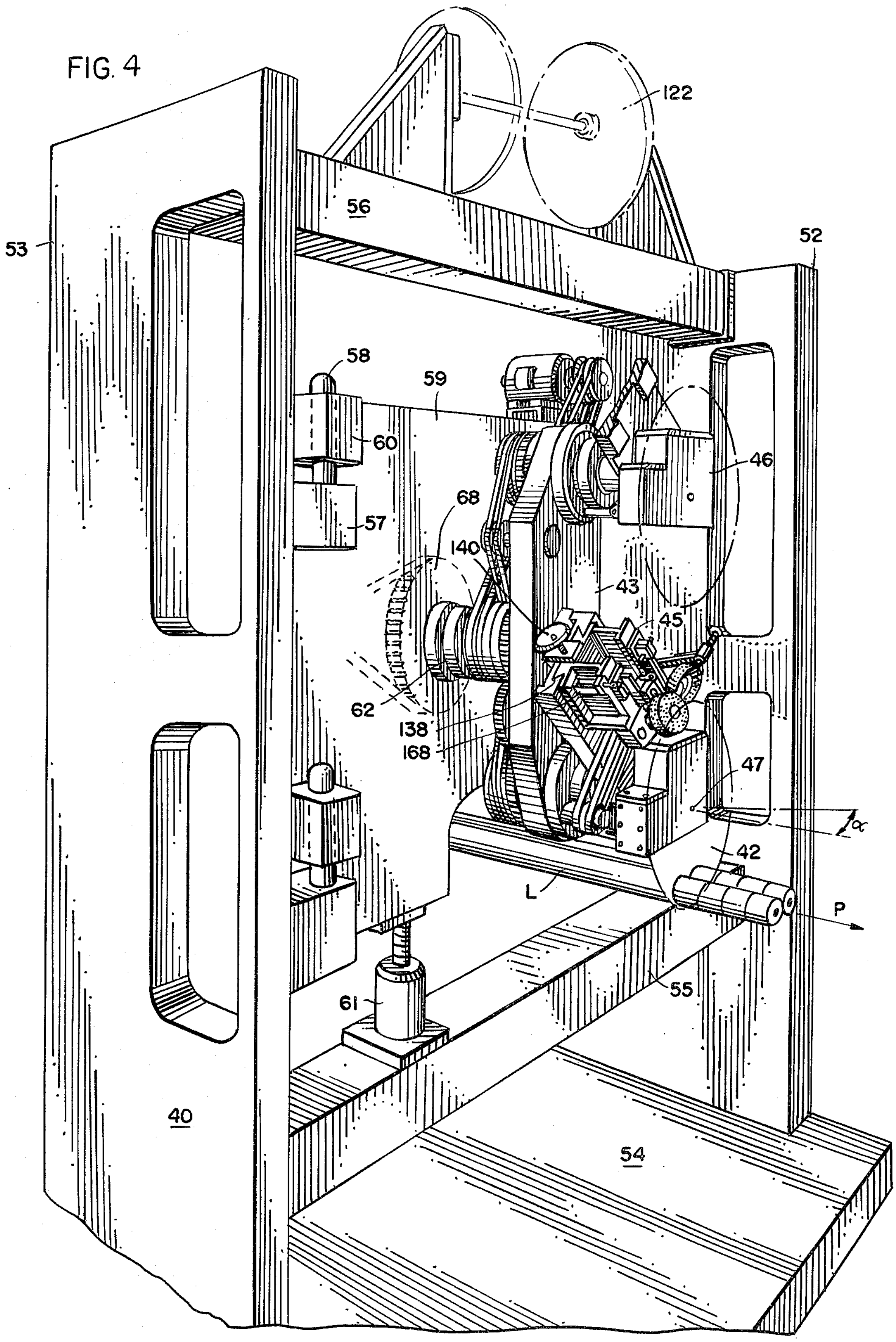
FIG. 4 is a fragmentary perspective view of the apparatus, differing from FIG. 1 in showing more of the frame and showing the cutting blades aligned vertically.
Figure 7:
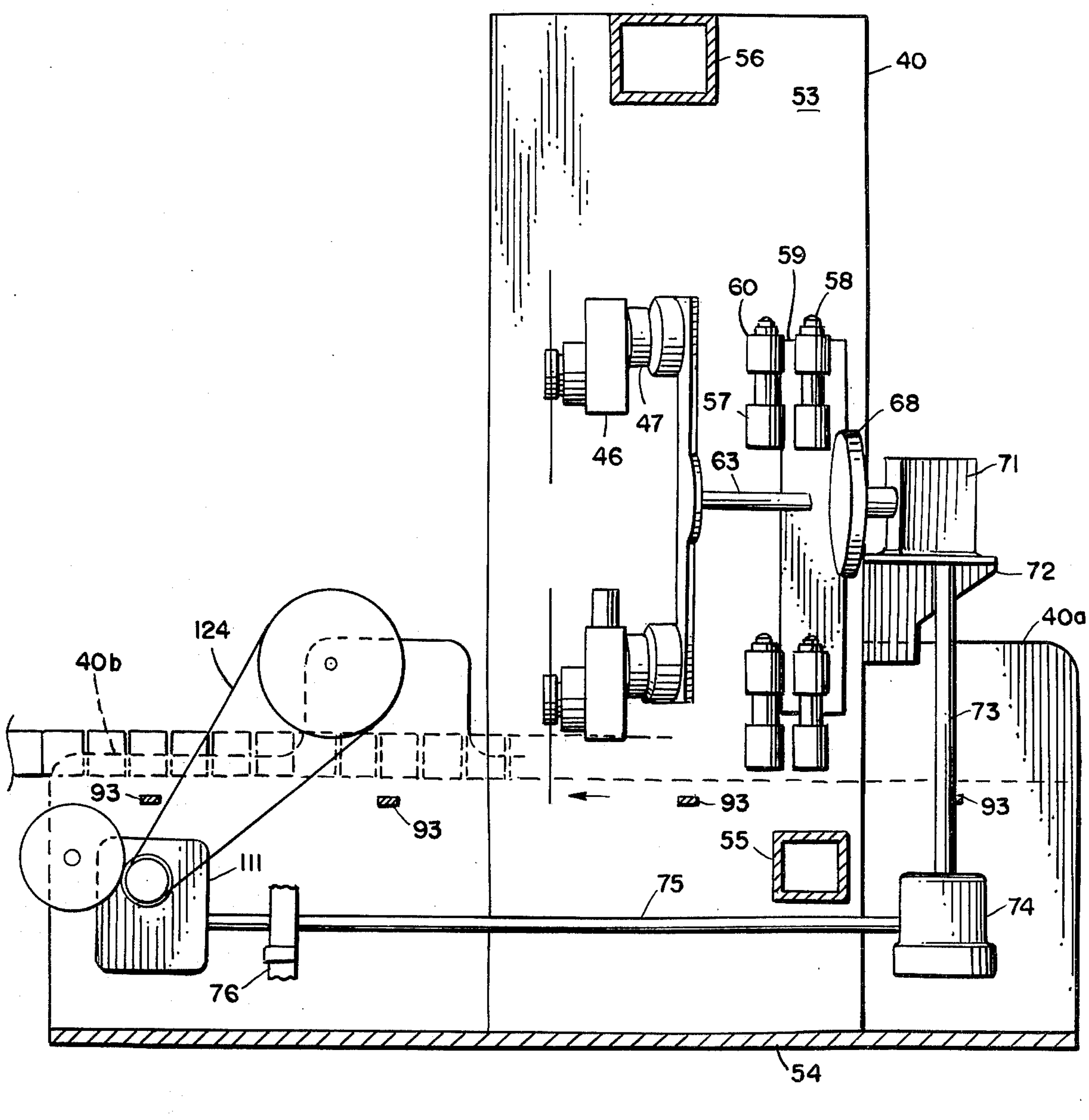
FIG. 7 is a fragmentary longitudinal sectional view of the inventive log saw as would be seen along the line 7–7 of FIG. 8.
Figure 8:
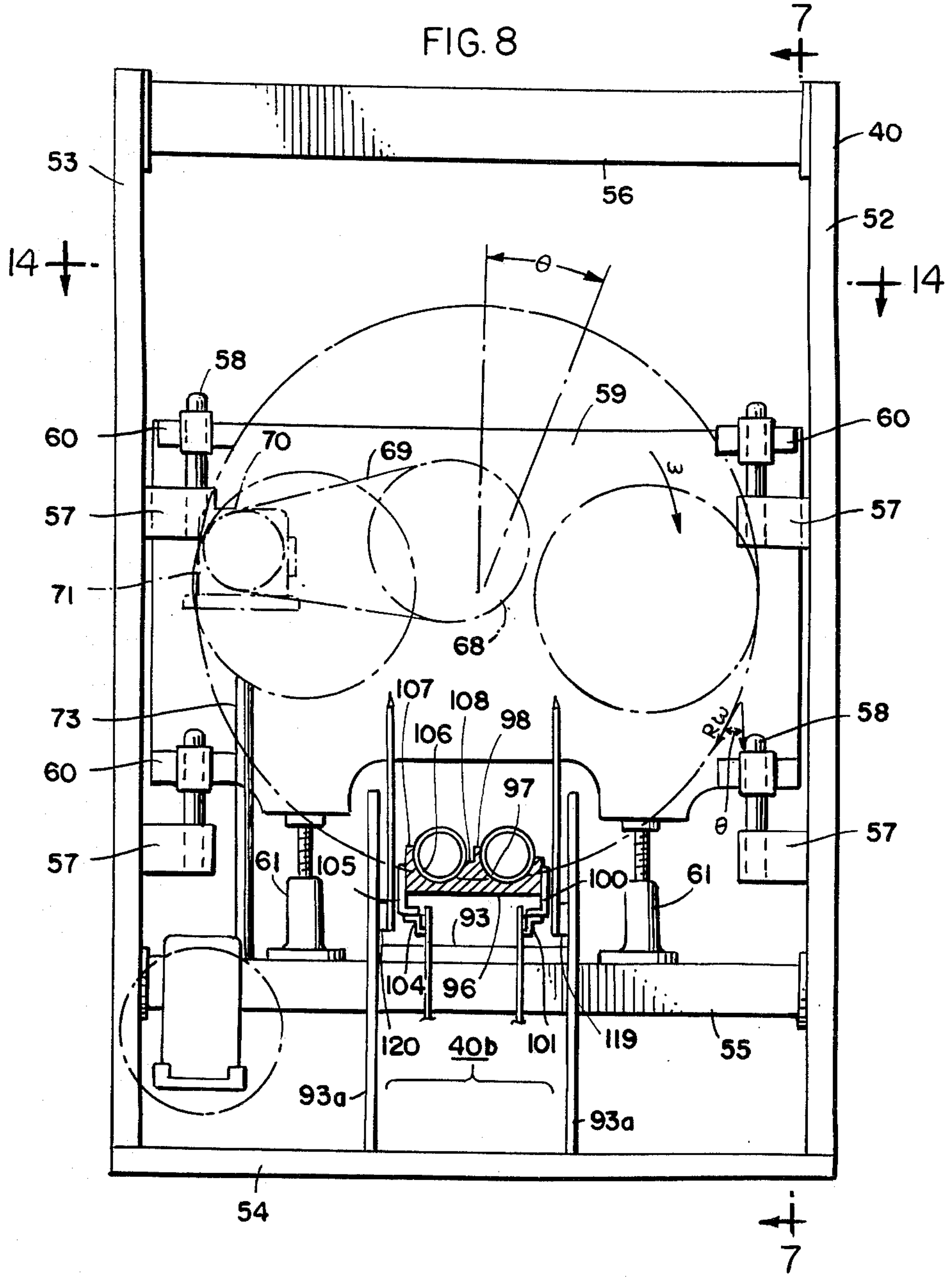
FIG. 8 is a fragmentary end elevational view of the apparatus of FIG. 7 — as seen from the front or downstream side of the apparatus.

Reference is now made to FIGS. 4, 7 and 8. Again, the numeral 40 designates the frame which includes upright members 52 and 53 (see FIG. 8) secured together by a base plate 54, an intermediate cross tie member 55 and an upper cross tie member 56. The frame 40 has extensions 40*a* and 40*b* to support the log conveyor head and tail shafts.

Figure 9:
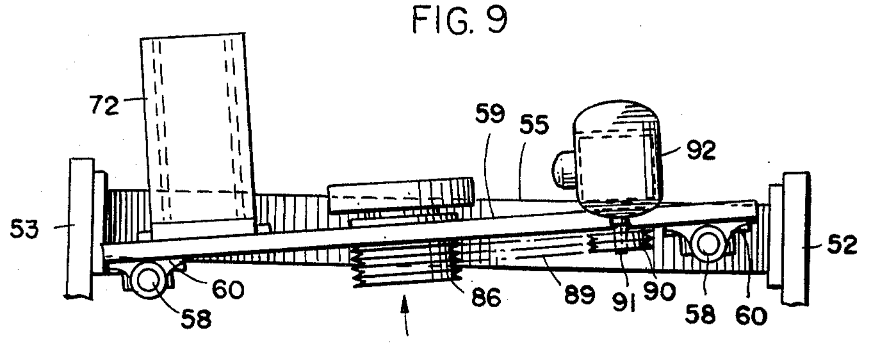
FIG. 9 is a fragmentary top plan view of the plate employed for mounting the skew arm and blade drive.

The upright members 52 and 53 have bolted thereto brackets 57. Each of the brackets 57 carries an upstanding pin 58 rigidly fixed therein (see also FIG. 1). The pins 58 serve as guides for the skew plate 59 which carries the skew arm 43. In other words, the skew plate 59 is disposed at the same angle relative to the path P as is the skew arm 43. This can be appreciated froma consideration of FIGS. 1 and 9 where the skew plate 59 is seen to be equipped with slide members 60 which are apertured to receive the pins 58. The plate 59 is supported in a desired position by means of screw jacks 61 (see also FIG. 4) which are in turn supported by the cross tie member 55. By adjusting the screw jacks 61, the location of the skew plate 59 on the pin 58 is adjusted accordingly — this being needed because the position of the skew plate 59 determines the position of the skew arm 43 and hence the position of the blades 42 and 42'. With high speed operation, the cutting disc blades wear down fairly rapidly (from a 24 inch diameter to an 18 inch diameter), so the screw jacks 61 lower the plate 59 and hence the blades 42 and 42' to properly engage the logs L.

The skew plate 59 (see the upper right hand portion of FIG. 10 and the central portion of FIG. 4) carries a housing 62 in which the skew arm shaft 63 is rotatably supported. Here it should be noted that for the purpose of clarity and ease of understanding, the skew plate 59 and the skew arm 43 are presented in the drawings at an angle so as to properly orient the reader. In consequence, the blade spindle 47 is depicted parallel with the edge of the drawing — see the lower left hand portion of FIG. 10.

The housing 62 is suitably bolted to the skew plate 59 as at 64 and is equipped with internal bearings as at 65 and 66 to rotatably support the skew arm shaft 63. The skew arm shaft 63 in turn is bolted as at 67 to the skew arm 43.

Figure 10:
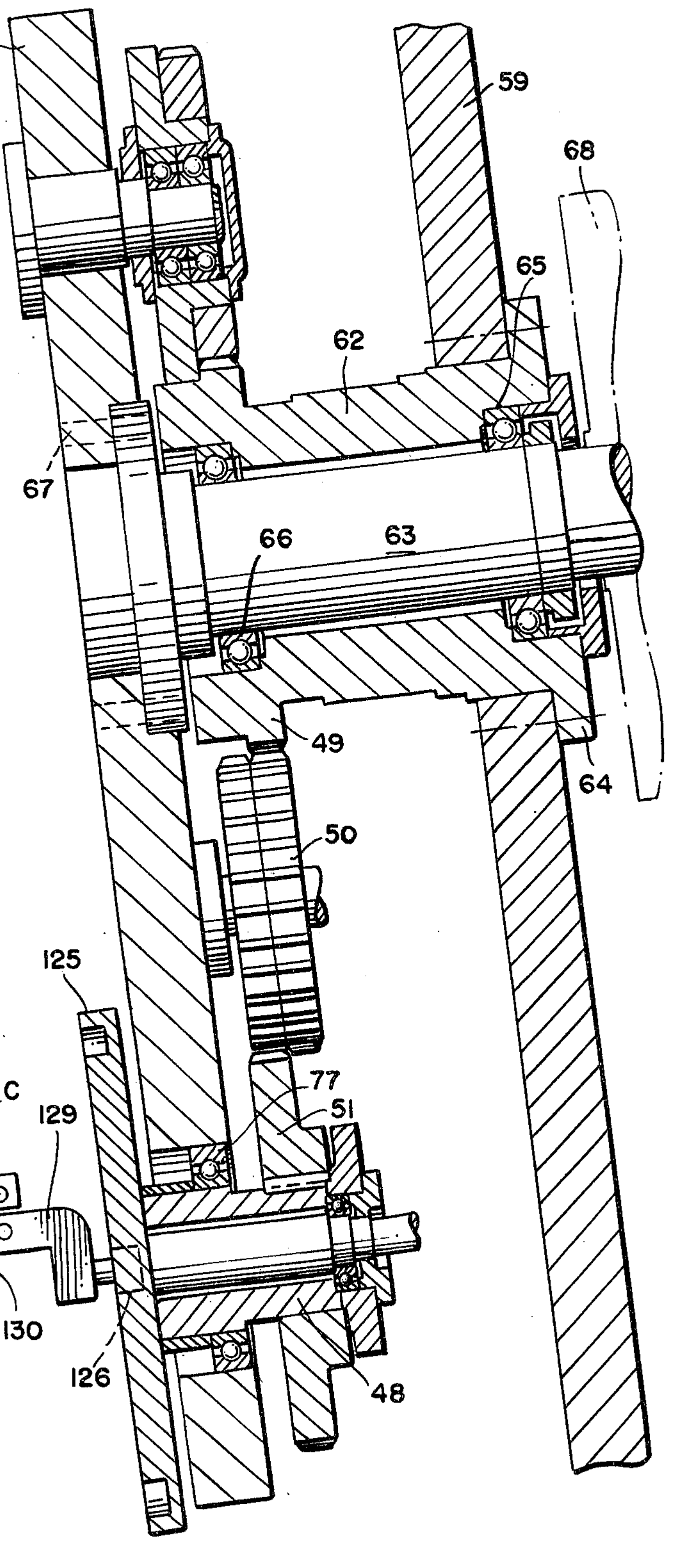
FIG. 10 is a fragmentary top plan view of the skew arm, the mounting and drive therefor and a portion of the planetary housing.
Figure 10:
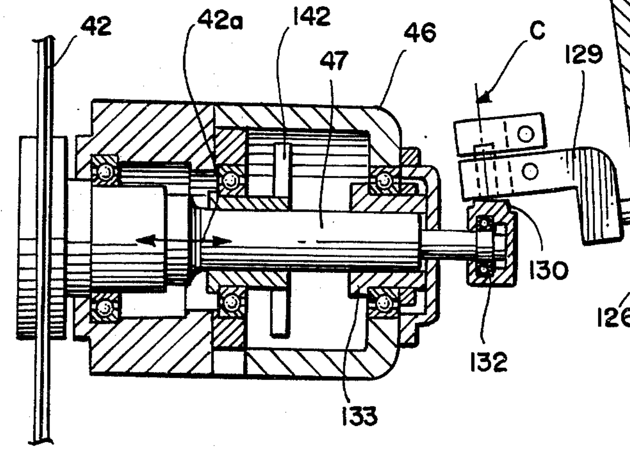

Still referring to FIG. 10, the skew arm shaft 63 has fixed to it a pulley 68 on the upstream side of the skew plate 59. Referring now to FIG. 8, the pulley 68 is seen to be connected by means of a timing belt 69 to a drive pulley 70 supported on the shaft of a gear box 71 (see also FIG. 7). The gear box 71 is supported on a pedestal 72 extending rearwardly, i.e., upstream, from the skew plate 59 (see also FIG. 9). Thus, the gear box 71 moves vertically with the plate 59 to adjust for wear on the blades 42 and 42'.

Rotational power is delivered to the gear box 71 by means of a vertically extending shaft 73. The lower portion of the shaft 73 is splined to accommodate the desired vertical movement of the skew plate 59 and is received within another right angle drive gear box 74 (see FIG. 7). Rotational power to the gear box 74 is derived from a line shaft 75 (still referring to FIG. 7) which is suitably supported on the frame 40. The line shaft 75 is equipped with a V-belt drive 76 which derives rotational power from a motor (not shown).

PLANETARY SHAFT MOUNTING

Referring now to FIG. 10, the planetary shaft 48 is seen in the lower central portion thereof. This shaft 48 is suitably journalled in th skew arm 43 by means of bearings 77 and 78 (designated only in FIG. 12). The shaft 48 has fixed to it the planetary gear 51 while the skew arm 43 rotatably supports the idler gear 50. In the illustration given, the idler gear 50 is a split gear in order to phase the planetary gear 51 in proper relation to the main gear 49. The main gear 49 is fixed to the housing 62 and hence is rigid with the skew plate 59. Thus, as the skew arm shaft 63 is rotated, the skew arm 43 rotates to move the idler gears 50 and 50' around the main gear 49. By interposing the planetary gear 51 between the planetary shaft 48 and the idler gears 50, the planetary shaft 48 is maintained in a given attitude with respect to the frame notwithstanding the rotation of the skew arm 43.

BLADE DRIVE

Figures 12, 13:
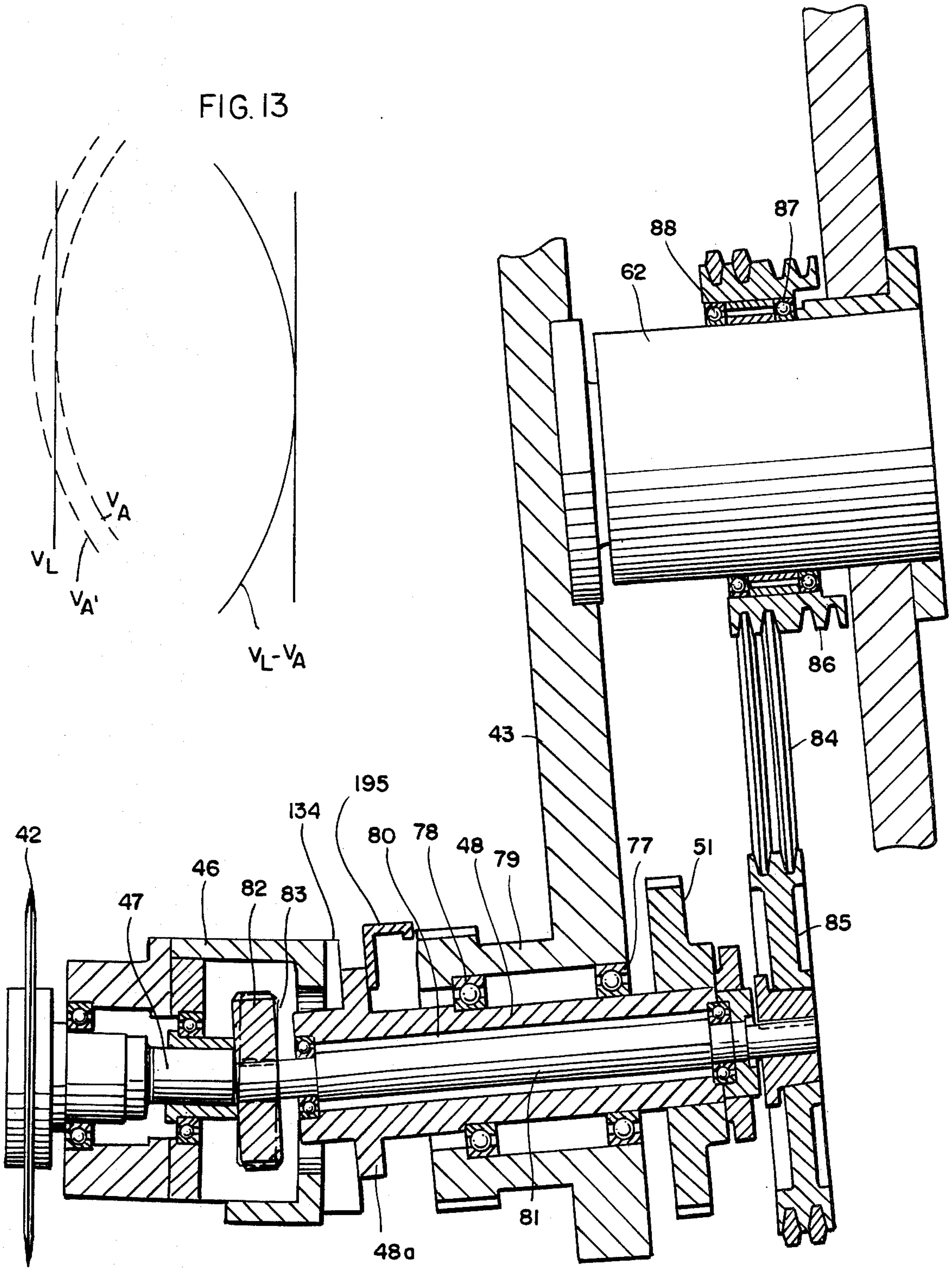
FIG. 12 is a view similar to FIG. 10 but showing the drive for the disc blade.
FIG. 13 is a chart illustrating the velocity compensation achieved according to the mechanism of FIG. 11.

Reference is now made to FIG. 12 wherein once again, the skew arm 43 is shown inclined to the edge of the paper. The skew arm 43, as seen in FIG. 12 is equipped with a boss 79 (omitted from the showing in FIG. 10) which accommodates the second bearing 78 for the planetary shaft 48. The planetary shaft 48 is hollow, i.e., has a throughbore 80 which accommodates a drive shaft 81 for the disc blade 42. As can be seen in the lower left hand portion of FIG. 12, the drive shaft 81 is connected to the blade spindle 47 by means of helical gears 82 and 83 which permit the positioning of the blade spindle 47 with its axis parallel to the path P — and therefore introduces a reverse skew angle.

Rotational power for the drive shaft 81 is derived from a belt drive 84 which includes a pulley 85 fixed to the drive shaft 81 and a drive pulley 86 journalled on the housing 62 by means of bearings 87 and 88. The pulley 86 also can be seen in FIGS. 1 and 9 and there is seen to be driven through a belt system 89 from a pulley 90 mounted on the output shaft 91 of a motor 92. The motor 92 is also mounted on the skew plate 59 so that the drive for the blades 42 and 42' moves with them as the skew plate 59 is adjusted to compensate for blade wear. The pulley 86 (still referring to FIG. 9) is a double pulley with the downstream portion delivering rotational power to the blade pulleys while the upstream portion receives power from the motor 92.

LOG CONVEYOR

Figure 18:
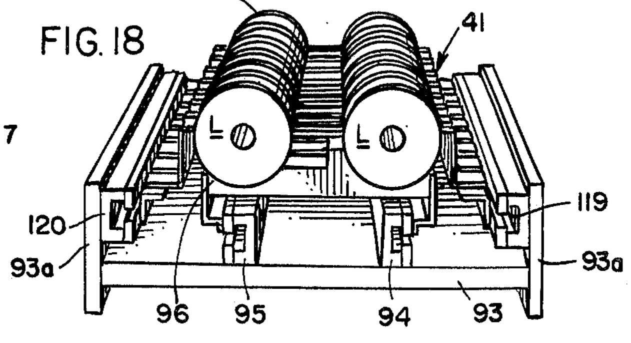
FIG. 18 is a perspective view of a fragment of the log advancing mechanism.

FIG. 18 shows in perspective a section of the log conveyor 41. The conveyor 41 includes a series of spacers 93 (see FIG. 7) supported by upstanding frames 93*a* (compare FIGS. 8 and 18). The spacers 93 have chain guides 94 and 95 which support and guide runs of endless chain for supporting the lower carriers 96.

Figure 17:
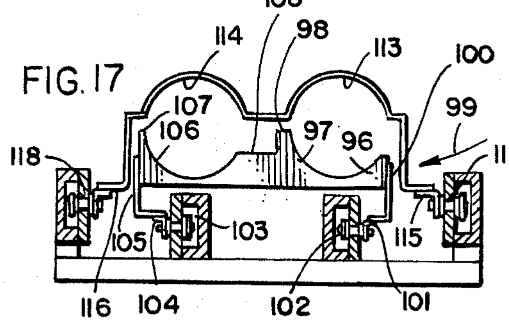
FIG. 17 is an end elevational view of a portion of the log conveyor.

A more detailed showing o the lower carrier 96 can be seen in FIG. 17. The carrier 96 includes a unitary casting suitably contoured to support the logs or rolls. The support for the right hand roll (as seen in FIG. 17) has an arcuate portion 97 curving upwardly to a point 98 which is essentially horizontally aligned with the axis of a log supported by the carrier 96. Thus, the left hand portion of the part 97 constitutes an abutment restraining any sideways movement of a log under the influence of the movement of the disc blades in the direction indicated by the arrow 99.

Secured to the right hand portion of the part 97 is an L-shaped clip 100 which is secured to another clip 101 provided as part of one of the lower chain runs 102. The other lower chain run 103 (which travels in the guide 95) also is equipped with a plurality of clips 104 — one for each of the lower carriers 96. Secured to the clip 104 is another L-shaped clip 105 which is connected (as by welding) to the casting 96. The casting 96 is another arcuate part 106 for supporting the left hand roll. Again, the left hand portion of he arcuate recess 106 rises to the point 107 approximately on the horizontal center line of the log supported thereby to stabilize the same against the force exerted by the orbiting disc blade during a cut. The right hand portion as at 108 of the part 106 is contoured upwardly and connected to the arcuate part 97 as seen in FIG. 17.

Figure 16:
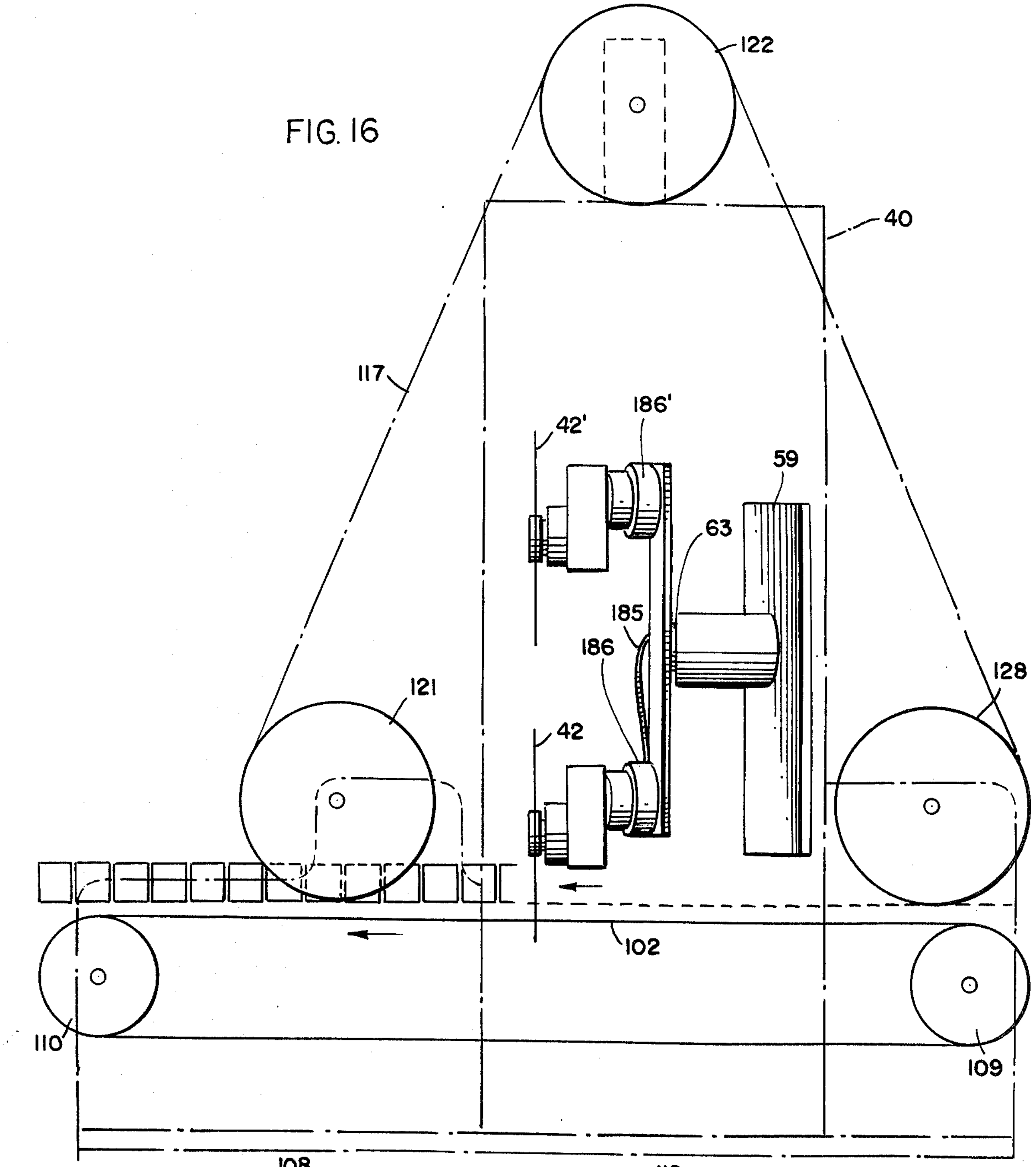
FIG. 16 is a side elevational view similar to FIG. 7 but showing details of the log advancing mechanism.

Referring to FIG. 16, the chain 102 is designated in the lower center portion of the view and is seen to be entrained about sprockets 109 and 110 which are rotatably supported on the frame — more particularly, on the portions 40*a* and 40*b*, respectively. Power for the chains 102 and 103 is derived from the line shaft 75 (see FIG. 7) via the gear box 111.

A plurality of upper carriers 112 (see FIGS. 17 and 18) are also provided as part of the log conveyor 41. The upper carriers 112 are also deformed strap-like members, providing arcuate portions as at 113 and 114 (see FIG. 17), corresponding, respectively, to the arcuate portions of the lower carriers as at 97 and 106. The upper carriers 112 are secured to clips 115 and 116 associated, respectively, with endless chain runs 117 and 118. The chain runs 117 and 118 are guided in guides 119 and 120 (see FIG. 18). The guides 119 and 120 are mounted on the auxiliary side frames 93*a* (see FIG. 18). The chain 117 (for example) is designated in FIG. 16 and is seen to be entrained on three sprockets 121, 122 and 123. Each of the sprockets (along with their companions for the chain 118) are mounted on cross shafts suitably journalled in the frame. The triangular configuration of the chains 117 and 118 avoids any interference of the return run of the upper chains with the cutting mechanism — which is supported within the frame 40 immediately above the log conveyor 41. Power for the chains associated with the lower carriers 96 is provided from the gear box 111 through spur gears and for the upper carriers 112 is also provided from the gear box 111 but via a timing belt drive 124 — see the lower left hand end portion of FIG. 7.

In the operation of the log conveyor 41, each set of upper and lower carriers 96 and 112 is suitably spaced longitudinally from adjacent sets of carriers (see FIG. 18) to permit passage between adjacent sets of the disc blades 42 and 42', as the case may be. As indicated previously, the log conveyor 41 operates continuously so as to advance the log L at a uniform speed through the cutting station.

VELOCITY MATCHING MECHANISM

From the foregoing it will be appreciated that the logs L are being advanced by the log conveyor 41 at constant velocity through the cutting station. In the system illustrated, i.e., one to produce 1200 rolls of 4½ inches long toilet tissue each minute from two logs and with two cutting disc blades 42 and 42', each log must be advanced at a speed of 45 inches per second. The log velocity $V_L$ is determined as follows:

$$V_L = \frac{\text{cuts/minutes} \times \text{cut length}}{60\ \text{sec/min.}} \tag{1}$$

Here there are 600 cuts per minute and the cut length is 4½ inches.

However, the blade velocity in the direction of log travel, i.e., the path P is not linear. Instead, the blade velocity in the axial direction ($V_A$) is:

$$V_A - R\omega \sin \alpha \sin \Theta \tag{2}$$

wherein $R$ is the radius of the cutting arm — see FIG. 2, $\omega$ is the rotational velocity of the skew arm 43, and $\Theta$ is the angular disposition of the skew arm. For simplicity, $\Theta$ (see FIG. 8) is zero when the saws are on the vertical axis. Cutting, in the system illustrated, ocurs between $\Theta = 135°$ and $\Theta = 225°$. The cutting arm radius R is 18 inches and the angular velocity $\omega$ is $10\pi$ radians per second, viz., $2\pi/60 \times$ RPM of skew arm 43. Solving equation (2) for $\alpha$ (assuming $V_A = V_L$), a value of 4°-34' for the skew angle results.

By increasing the skew angle slightly, to 5°, the velocity of the blade in the axial direction $V_A'$ is greater than the log velocity $V_L$ at the middle of the cut, but lower at the beginning and end of the cut — see the left hand part of FIG. 13. In contrast, by selecting the lower skew angle, the exact match is at mid-cut with $V_A$ being lower than $V_L$ at all other parts of the cut — see the curve designated $V_A$.

The middle segment of the FIG. 13 curve illustrates graphically the difference between $V_L$-$V_A$ or the velocity compensation required to match the axial component of the blade velocity with the log velocity ($V_A = V_L$) throughout the entire cut, viz., $135° \leqq \Theta \leqq 225°$. Thus, the equation for velocity match is $$V_L - R\omega \sin \alpha \cos \Theta = 0 \tag{3}$$

In the illustrated embodiment, the velocity matching is achieved by a cam 125 — see FIG. 10. The axial movement of the disc blade 42 (or 42' as the case may be) to achieve this velocity match is determined by integrating equation (3), between values of $\Theta$ from $\pi/4$ to $-\pi/4$, resulting in $$x = V_L \frac{\Theta}{\omega} - R \sin \alpha \sin \Theta \tag{4}$$

With the parameters employed, the movement axially of the disc blade is approximately ±1/32 inch — see the right hand segment of FIG. 13. However, substantial *g* forces are involved which can be appreciated by differentiating equation (3) with respect to time, resulting in the following:

$$\text{accel.} = R\omega^2 \sin \alpha \sin \Theta \tag{5}$$

With the parameters selected, the acceleration is almost 3*g*.

Figure 11:
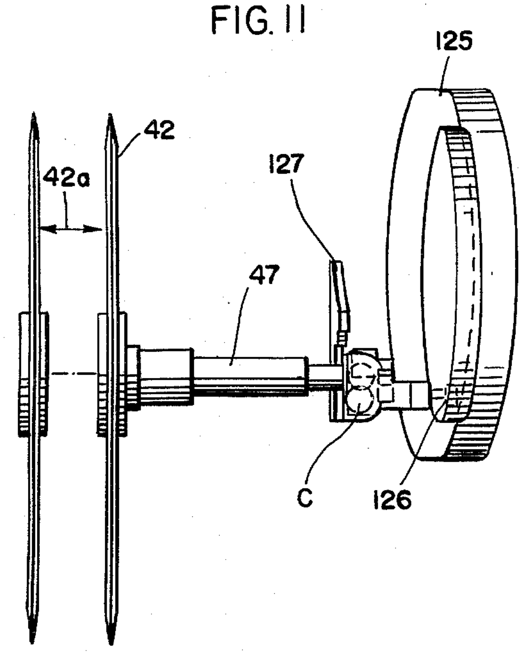
FIG. 11 is a fragmentary side elevational view of the cam and associated mechanism for velocity compensation.

As indicated, the axial movement of the blade 42 (see FIG. 10) is achieved through the use of a cam 125 — fixed to the skew arm 43 (see the lower central portion of FIG. 10 and also the right hand portion of FIG. 11).

The numeral 126 designates a cam follower which is connected via a bell crank linkage to the blade spindle 47. Thus, as the cam follower 126 is moved in a plane parallel to the skew arm 43 (as designated by the double ended arrow 126*a* in FIG. 14), the disc blade 42 is moved axially as indicated by the double ended arrow designated 42*a* (see the lower left hand portion of FIG. 10). Here it should be appreciated that cam follower movement is achieved because the cam 125 is fixed to the skew arm 43 (and therefore assumes different attitudes relative to the ground) whereas the cam follower 126 is supported by the planetary shaft 48 (see FIG. 14) and thus maintains a constant attitude relative to the ground. Still referring to FIG. 14, it is seen that a bracket 127 is fixed (as by bolting) to shoulder 48*a* provided on the planetary shaft 48. For the purose of mounting the cam follower 126, a block 128 is fixed to the bracket 127. An L-shaped arm 129 is pivotally mounted on the block 128 for movement about the axis C. The L-shaped arm 129 carries the cam follower 126 at one end and at the other end supports a push-pull block 130. The vertical movement of the cam follower 126 is depicted by the double ended arrow 126*a* in FIG. 14. This converted to rotary motion (of push-pull on the spindle 47) by the pivot mounting — see the curved double-ended arrow 42*a* of FIG. 14.

Figure 14:
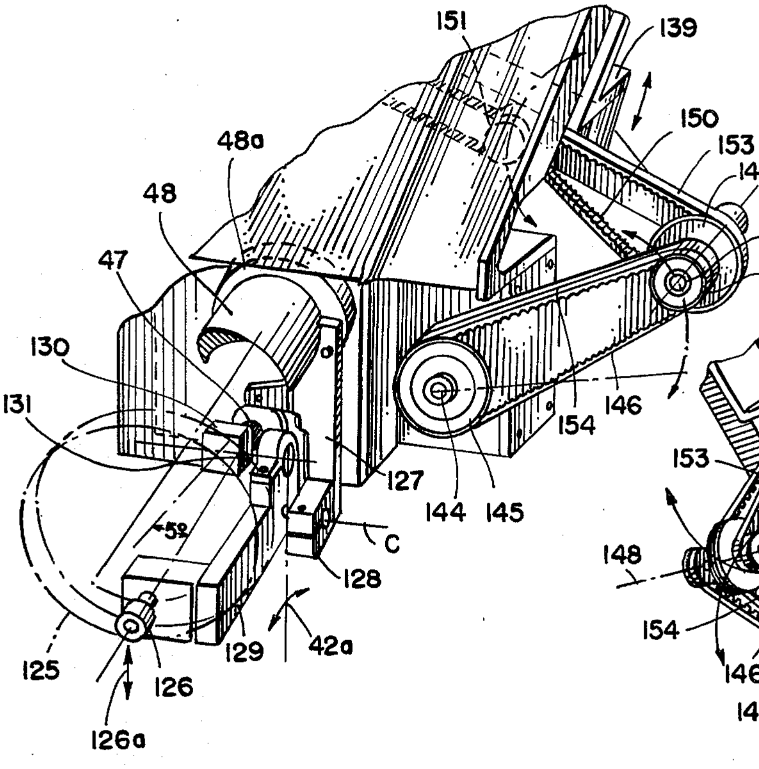
FIGS. 14 and 15 are fragmentary perspective views (from rear and front, respectively) of the velocity compensation mechanism and drive for the sharpening means.

More particularly, the cam follower arm 129 clamps a rod 131 eccentric to the pivot axis C, the rod 131 carrying the block 130. The block 130 is connected to the blade spindle 47 — see FIG. 10. Thus, as the cam follower 126 moves up and down (as seen in FIG. 14), the spindle 47 moves in or out. The push-pull block 130 retains the enlarged end of the spindle 47 and rotatably supports the spindle 47 by means of a bearing 132. Additionally, the spindle 47 is splined and rides in splined blocks 133 to accomodate the axial or push-pull movement. By contouring the cam as a function of equation (4), the advantageous velocity match can be achieved. For different log speeds or different saw geometries, the apparatus can be adapted readily by changing the tapered bracket 134 (see FIGS. 6 and 12) and shimming the brackets 57 — to change the skew angle. Also the cam 125 can be replaced to achieve a different velocity match.

BLADE SHARPENING MEANS

Figure 15:
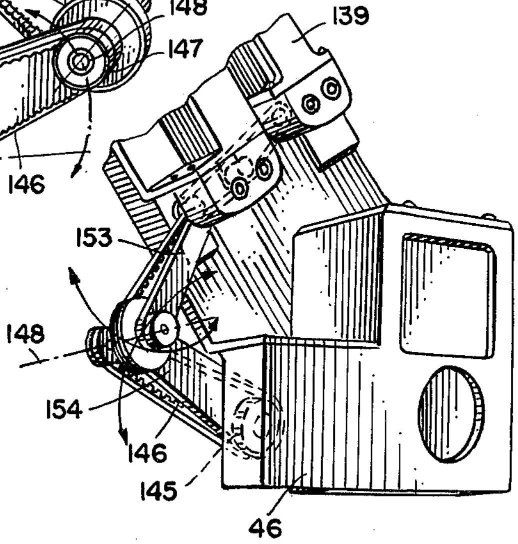

The blade sharpening means 44 and 44' are depicted schematically in FIG. 2. These are illustrated as two wheels or "stones" which are mounted on the casings 46 and thus also maintain a constant attitude relative to ground. More particularly (and now with reference briefly to FIGS. 1, 7 and 15), each planetary shaft supports a casing 46 for the spiral gears 82 and 83 previously designated with respect to FIG. 12. The casings 46 provide the support for the blade sharpening supports 45.

In FIG. 19, the sharpening means 44 includes a pair of stones 135 and 136 inclined so as to give an approximately 14° angle of bevel to the cutting edge of the disc blade 42. Thus, each stone 135 and 136 is inclined at approximately 7° to the plane of the disc blade 42, but in opposite directions. Means to be described provide (1) for rotating the stones 135 and 136 about their own axes, (2) for moving the stones 135 and 136 axially relative to the disc blade 42 — to limit the sharpening to the half-cycle when the blade is not cutting, and (3) for moving the stones 135 and 136 radially relative to the blade 42 to compensate for blade wear.

The casing 46 carries the support 45 which includes a superstructure 137. The superstructure 137 is equipped with a dovetail slot 138. Slidably received for essentially vertical movement within the dovetail slot 138 is a portion of the subframe 139 — the subframe 139 carries the sharpening means 44. Vertical adjustment or positioning of the subframe 139 is achieved by means of the hand wheel 140 which is rotatably mounted within the superstructure 137 and is threadably received at 141 (see FIG. 21) within the subframe 139. By turning the hand wheel 140, the subframe 139 is moved radially relative to the disc blade 42 to adjust for wear of the sharpened periphery.

Each of the stones 135 and 136 is rotatably mounted within the subframe 139 but because the drives for these stones, in the illustrated embodiment, determine in large measure the structure of the mounting, the drive system for delivering rotational power to the stones 135 and 136 will now be described.

All of the rotational power for both stones 135 and 136 is derived from a spur gear 142 (see the lower left hand portion of FIG. 10) which is driven in synchronism with the blade spindle 47. Not shown in FIG. 10 but immediately behind the spur gear 142 is a second spur gear 143 (see FIG. 23). The spur gear 143 is mounted on a shaft 144 (still referring to FIG. 23) which carries a pulley 145 — see also FIGS. 14 and 15. The pulley 145 is seen in dotted line in FIG. 22 and the axis of the shaft 144 is so designated in FIG. 21.

The pulley 145 is connected by a belt 146 to a pulley 147 with the pulley 147 being mounted on a shaft 148. The shaft 148 carries a drive pulley 149 which is connected by means of a belt 150 to a driven pulley 151 (see FIG. 14) mounted on a shaft 152 journaled in the subframe 139 (see FIG. 24). The axis of the shaft 152 is designated in FIG. 21. The shaft 148 is journalled in a bearing arm 153 roatably mounted on the shaft 152 and is also rotatably mounted on a pivot arm 154 rotatably mounted on the shaft 144. Thus, as the subframe 139 is moved downwardly (as viewed in FIGS. 14 and 15), the shaft 152 likewise moves downwardly and to accommodate this while still driving the same, the shaft 148 moves outwardly, i.e., to the left in FIG. 21 under the elbow-type action achieved by the cooperation of arms 153 and 154 — see the curved arrows about the shaft axis 148 in FIG. 15.

The second pulley 155 on the shaft 152 (see FIGS. 22 and 24) delivers power by a belt 156 to a pulley 157 associated with the stone 136.

Also mounted on the shaft 152 (see FIG. 24) is a spiral gear 158. This mates with a spiral gear 159 (see FIG. 25) which is fixed to a hollow shaft 160. The hollow shaft 160 is equipped with internal splines to carry the splined shaft 161 (see FIG. 26) which in turn carries the stone 135. The splined connection between the shafts 160 and 161 permits the axial movement of the stones to bring them into engagement with the edge of the disc blade 42 when sharpening is indicated.

Each of the spiral gears 158 and 159 is arranged at approximately 3½° angle so that the total offset of the shaft 160 (or the shaft 161) relative to the shaft 152 is approximately 7° — this being one-half of the bevel desired for the periphery of the disc blade 42.

The drive for the other stone 136 (see FIGS. 27–29) is essentially the same. For example, there is an intermediate shaft 162 which carries a spiral gear 163 — much the same as the shaft 152 carries the gear 158. As mentioned previously there is a pulley 157 which receives rotational power from the shaft 152 via the pulley 155. The spiral gear 163, also fixed to the shaft 162, mates with a spiral gear 164 (see FIG. 28) mounted on the exterior of a hollow shaft 165. The shaft 165 is equipped with splines in its hollow interior which receive the splined shaft 166 (see FIG. 29) and which carries the stone 136. One difference between the drive connection to the stone 136 (as seen in FIGS. 27–29) from the drive to stone 135 (shown in FIGS. 24–26) is that the spiral gears 163 and 164 (FIGS. 27 and 28) are each arranged at an angle of about 3½° which develops not only the desired 7° offset referred to in connection with the stone 135 but also develops an additional 3° offset in a direction orthogonal to the 7° direction. This insures that the edge of the stone moving into the blade performs the sharpening contact. In other words, if the stone 136 were not additionally canted as just described, the edge of the stone moving away from the axis of the blade would be doing the sharpening with the possiblity of a poor bevel, flying debris, etc.

Before describing the means for moving the stones radially relative to the disc, the stone dressing feature will be described. From time to time it is advantageous to "dress" the stones, i.e., refurbish the grinding surfaces thereof. Rather than do this by hand, a laborious procedure and since it would be dangerous to do this while the disc blade 42 is rotating, a separate dresser drive is provided. For this purpose, a dresser drive nut 167 (see FIG. 26) is provided on the shaft 161 (which also carries the stone 135). This permits the attachment of a portable motor or the like for turning the stone 135. When the stone 135 is rotated, rotational power is transmitted through the spiral gears 159 and 158 to the shaft 152 (see FIGS. 25 and 24). From there, rotational power is delivered via the pulley 155, the belt 156 to the pulley 157 which rotates the shaft 162. Then, through the spiral gear connection of gears 163 and 164, the shaft 165 is turned so as to rotate the stone 136. Inasmuch as the pulley 151 (see FIG. 24) is also turned along with shaft 152, this normally would result in rotating the disc blade 42. To avoid that, the pulley 145 (see FIGS. 22 and 23) is equipped with a one-way clutch. Thus, rotational power transmitted during stone dressing from the pulley 151 merely turns the pulleys 148 and 145 but does nothing further to the disc blade 42.

The means for moving the stones 135 and 136 axially relative to the blade 42 include air cylinders 168 and 169 (see FIGS. 4 and 19) which are mounted on the subframe 139. The air cylinder 168 is pivotally mounted as at 170 on the subframe 139. The piston rod 171 of the cylinder 168 is pivotally connected to a link 172 — see also FIG. 20. This can be appreciated further from a consideration of the upper left hand corner of FIG. 21 where it is seen that the generally vertically extending link 172 is fixed to a cross shaft 173 (see also FIG. 20). In like fashion, the piston rod 174 of the cylinder 169 is connected by means of a link 175 to a cross shaft 176. Fixed on the cross shaft 176, is a fork member 177 which is also seen in FIGS. 1 and 20. The cross shafts 173 and 176 are rotatably supported in brackets 178 (compare FIGS. 1 and 21). Interposed between each of the cross shafts 173 and 176 and their associated brackets 178 are rubber bushings. Each rubber bushing acts like a torsion spring mounting resisting rotary movement and thus urges the associated stone out of contact with the blade when the air pressure is released from the associated cylinder 168 or 169, as the case may be.

Inasmuch as the connection of the fork 179 (see the upper central portion of FIG. 21) to its associated stone shaft 166 and stone 136 is the same as the connection of the fork 177 to the splined shaft 161 and stone 135, only the latter will be described — the fork 179 being seen in FIG. 19.

The fork 179 is bifurcated at its lower end to provide arms 180 (see FIG. 21). Each arm 180 slottedly engages a side of a ball bearing collar 181 mounted on the shaft 66. Thus, as the piston rod 174 is extended from the cylinder 169, the link 175 is pivoted about the axis of the shaft 176. The rubber torsion spring mount of the shaft 176 tends to resist this movement and in so doing stores energy tending to return to its original condition. However, when the shaft 176 is turned under the urging of the air cylinder 169, the fork 179 is also pivoted about the axis of shaft 176 and moves its associated ball bearing collar 181 slightly to the left in FIG. 19, thereby urging the stone 136 into engagement with the periphery of the blade 42. The vertical slotted engagement of the collar 181 with the fork arms 180 permit a slight vertical movement so as to move along an arcuate pth closely approximating but not exactly linear with the axis of the shaft 166. The axial movement of the shaft 166 while the same is still delivering rotational power to the stone 136 from the gear 164 is achieved through the use of the splines connecting the shaft 166 with the gear carrying hollow shaft 165. The gearing and splines are protected against stone dust by the accordion sleeves 182 (see FIG. 19).

From the foregoing, it will be appreciated that the sharpening means 44, more particularly the cylindrical stones wheels 135 and 136 are driven from the same drive as that which drives the associated blade, i.e., the blade spindle 47. This substantially reduces both the weight and the space requirements while achieving high efficiency not only as far as blade sharpness is concerned but also the fact that the blades are sharpenable during the portion of each orbit when they are not cutting, and without the need for stopping the blade in a particular section of the orbit. Through the use of air pressure, illustrated, the stones are "air loaded" against mechanical stops 183 (see FIG. 20) for equal pressure on the disc blade 42, not for the purpose for positioning the grinding wheels as was characteristic of the prior art.

To deliver pressure fluid, i.e., air pressure to the air cylinders 168 and 169, and also to deliver lubricant or cooling fluid to the edges of the disc blades 42 and 42', a rotary connection 184 (see FIG. 5) is employed in conjunction with the skew arm shaft 63. The skew arm shaft is equipped with suitable longitudinal bores (not shown) which communicate with flexible hoses as at 185 (see FIG. 16) leading to a boss 186 integral with the skew arm 43. Thus, there is no rotary motion between the noses 185 and the skew arm 43. It should be noted that if only one disc blade 42 is employed, there would be no need for rotary connection inasmuch as the flexible hose would then run from the frame to the portion of the planetary shaft which retains a fixed attitude relative to the frame.

The integral boss 186 is shown in fragmentary form in FIG. 30 and is seen to be equipped with a collar 187 bolted thereto be means of bolts 188. The collar 187 forms one half of the second rotary connection in conjunction with an internally grooved ring 189. The outer collar 189 is fixed to the planetary shaft 48 by means of a J-shaped clip 190 which extends between the collar 189 and the previously mentioned ring 128 fixed with respect to the planetary shaft 48. Thus, as the skew arm 43 rotates, the inner collar 187 rotates within the outer collar 190 to provide the second rotary connection. Still referring to FIG. 30, the inner collar 187 is equipped with a peripheral groove 191 which extends over about 180° — see also FIG. 31. Compressed air is delivered to the partial perimetric groove through an inlet 192 (see FIG. 32) coupled to one of the hoses 185. The inlet 192 in the boss 186 communicates with an axial bore 193 in the boss 186 which is in permanent communication with an aligned axial bore 194 in the collar 187. A short radial bore 195 communicates the bore 194 with the previously mentioned 180° perimeter groove 191.

The outer collar 189 is equipped with a radially extending bore 196 which is aligned with the 180° perimeter bore 191 and serves as an outlet for compressed air. Thus, over somewhat less than about one-half the cycle compressed air is delivered through the bore 196 to the air cylinders 168 and 169.

A second inlet is provided as at 197 (see FIG. 33) in boss 186. This communicates with an axial bore 198 in the boss 186 which in turn is aligned with another axial bore 199 in the inner collar 187. The bore 199 has a radial branch 200 which is in continuous communication with a perimeter groove 201 in the innerface of the outer collar 189. An outlet 202 (see FIGS. 31 and 33) communicates the branch bore 202 through hoses (not shown) to the rotating edge of the disc blade 42. It will be appreciated that a similar arrangement is provided relative to the boss 186' (see FIG. 16) for use in conjunction with the disc blade 42'. By this arrangement, coolant or lubricating fluid is delivered continuous to the cutting blades while sharpening is performed only during the half cycle when the blade is not in contact with the work.

I claim:

1. A method of cutting logs of convolutely wound web material, comprising:

uniformly advancing a log along a path into a cutting station having an arm above said path, rotating said arm about an axis skewed with respect to said path, said arm having a disc blade mounted thereon with the blade axis spaced from the arm axis to cause said blade to intersect said path and cut a log, maintaining said blade axis at an angle skewed relative to said arm axis to position said disc blade continually perpendicular to said path whereby said disc blade makes a square cut through a log, and continuously planetarily rotating said disc blade about the blade axis from said arm axis.

2. The method of claim 1 in which a pair of logs are advanced in side-by-side relation in said path whereby said cutting is performed while said blade axis moves through an angle of about 90°.

3. The method of claim 1 in which said arm is equipped with cylindrical stones for sharpening said disc blade, rotating said stones continuously and selectively moving said stones into sharpening engagement with said disc blade when the same is out of cutting engagement with said log.

4. The method of claim 1 in which said arm is mounted for vertical movement in said station, and moving the axis of said arm vertically toward said path to compensate for wear on said disc blade.

5. A method of cutting logs of convolutely wound web material, comprising:

uniformly advancing a log along a path into a cutting station having an arm above said path, rotating said arm about an axis skewed with respect to said path, said arm having a disc blade mounted thereon with the blade axis spaced from the arm axis to cause said blade to intersect said path and cut a log, maintaining said blade axis at an angle skewed relative to said arm axis to position said disc blade continually perpendicular to said path whereby said disc blade makes a square cut through a log, continuously rotating said disc blade about the blade axis from said arm axis, said arm being equipped with cylindrical stones for sharpening said disc blade, and rotating said stones continuously and selectively moving said stones into sharpening engagement with said disc blade when the same is out of cutting engagement with said log.

* * * * *